UNITED STATES PATENT OFFICE.

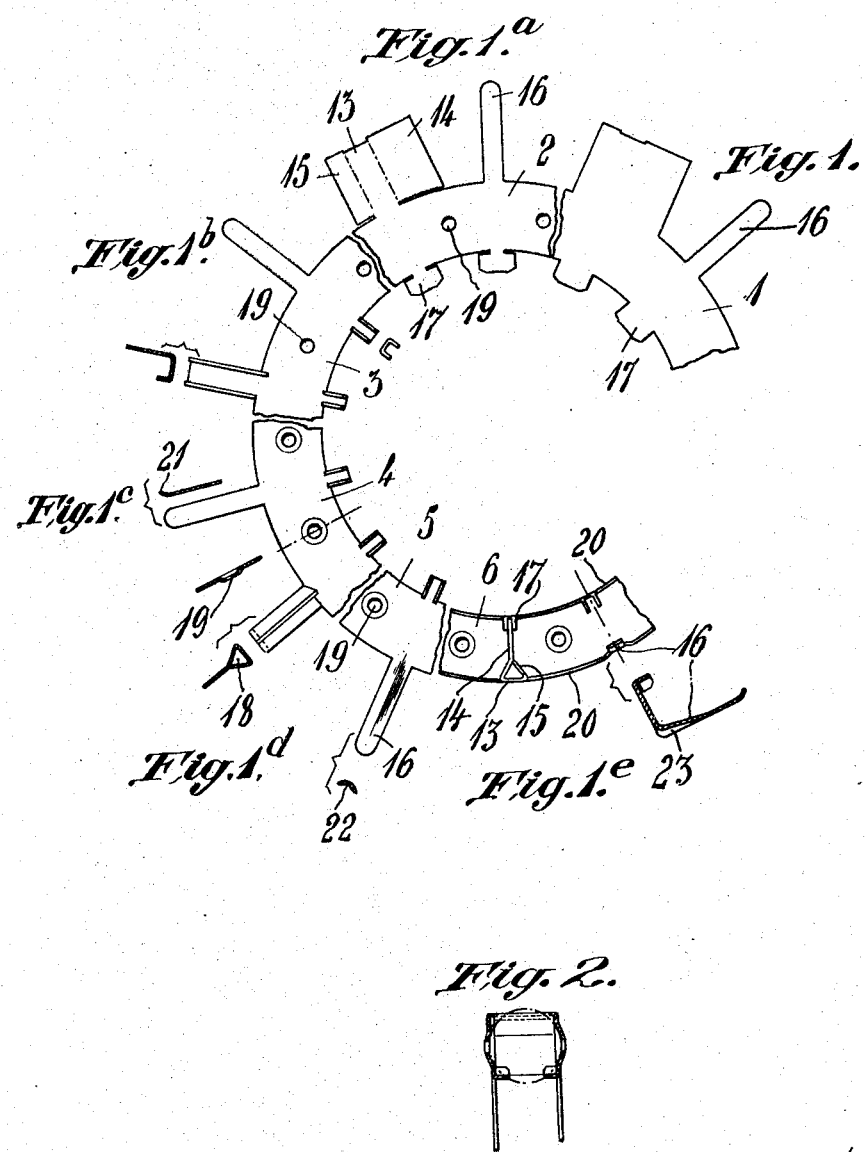

KALEB KARLSSON, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BALL-CAGE FOR BALL-BEARINGS.

1,223,396.

Specification of Letters Patent. Patented Apr. 24, 1917.

Application filed October 30, 1915, Serial No. 58,885. Renewed March 13, 1917. Serial No. 154,597.

*To all whom it may concern:*

Be it known that I, KALEB KARLSSON, a citizen of the Kingdom of Sweden, residing at Gottenborg, Sweden, have invented new and useful Improvements in Ball-Cages for Ball-Bearings, of which the following is a specification.

This invention relates to ball-cages for ball bearings in which the ball-cage is composed of rings, one or two or all of which are provided with projections by means of which the rings are secured to and spaced axially from each other, said projections constituting separators whereby the balls are kept apart. The invention relates more especially to ball cages of the said type in which the component parts of the ball-cage are held together by means of tongues extending from the rings, the tongues of one ring being engaged with the separators of the adjacent ring or rings and bent over to lock behind portions of the respective separators, to hold the parts of the ball-cage together. Moreover, the tongues are initially formed as radial projections from a flat ring and are subsequently bent over substantially at right angles to the surface of the ring.

One object of the invention is to strengthen the said tongues, and another object thereof is to facilitate the assembling of the parts of the ball-cage.

With these objects in view the invention consists in forming the tongues, for the whole or for part of their length, with a curved or channel-shaped cross-section or any cross-section other than a flat one, in order to impart to the tongues a greater degree of stiffness than that which they possessed, when they were of flat cross-section.

The invention consists, further, in forming the outer extremities of the tongues with a "bill" or turned-over portion, before the parts are assembled, so as to facilitate the further bending over of the tongue-ends, when the rings forming the cage are pressed together during the assembling of the several parts.

The invention will be more clearly understood by reference to the following description taken in connection with the accompanying drawing, which illustrates a preferred embodiment of the present invention, and in which—

Figure 1 shows a part of the blank from which the improved ball cage rings are made.

Fig. 1$^a$ represents a segment of the blank after it has been further cut.

Figs. 1$^b$, 1$^c$ and 1$^d$ represent segments of the blank in progressive stages of formation.

Fig. 1$^e$ represents a segment of the completed ring.

Fig. 2 shows a sectional view of a part of a finished ball-cage composed of two rings.

Referring to Fig. 1 of the drawing, the segments 1, 2, 3, 4, 5 and 6 of the ring show different stages of its manufacture.

The first stage (segment 1) consists in stamping a blank in the form of a plane ring provided at its outer edge with projections to form the brackets 13 and the wings 14, 15, and with other narrower projections to form the tongues 16. At the inner edge the ring is provided with small projections to form the lugs or ears 17. The second stage of the manufacture (segment 2) comprises the punching of the apertures 19 serving as ball-seats. In the third stage (segment 2) the wings 14 and 15 and the lateral parts of the lugs or ears 17 are separated from the edges of the ring, and at the same time the said parts are bent at right angles to the plane of the ring (segment 3). The fourth stage (segment 4) consists in bending the part of the wing 14 adjacent the bracket 13, and the wing 15 together, so that they together with the bracket 13 form the triangular space 18, into which a tongue 16 of the adjacent ring or rings of the ball-cage is to be introduced, and in bending the portion of the broader wing 14 situated outside said triangular space at right angles to the ring. In the same stage of manufacture the material around the apertures 19 is pressed outwardly, so as to form the ball-seats in conformity with the surfaces of the balls, and the outer end of each tongue 16 is curved or bent in the form of a "bill" 21, in order to facilitate the further bending over of the tongue-ends, when assembling the ball-cage. The fifth stage (segment 6) comprises the bending of the edges 20 of the ring inwardly in such manner, that the brackets 13, the wings 14, 15 and the lugs or ears 17 are turned at right angles to the ring. In the same stage the tongues 16 are bent to form, at least at the part adjacent the ring, the angular or trough-shaped cross-section shown at 22 in connection with segment 5 and at 23 in connection with segment 6. At the completion of this stage the different rings of the ball-cage are finished. In the sixth and last stage the ball-cage is assembled, the outer ends of the tongues 16 being bent so as to lie between the adjacent ring or rings and the pair of wings 14, 15 belonging to said ring or rings, whereby the rings will be rigidly secured or locked to each other, as shown in Fig. 2. Thus each of the wings 14 or, if the wings 15 are of the same size as the wings 14, each pair of wings 14, 15 will serve as a separator separating two consecutive balls of a row of balls. By forming the tongues with an angular or trough-shaped cross-section they have imparted to them a stiffening, which they did not possess when they were of flat cross-section, and are thereby prevented from bending improperly, when assembling the ball-cage.

As shown on the drawing, the tongues 16 are of equal width throughout. If desired, their width may, however, increase toward the base. Instead of the angular cross-section shown on the drawing the cross-section of the tongues may be curved or U-shaped, and in this latter case the sides may be bent more or less inwardly and, preferably, in such manner, that they are situated on the inner side of the tongues in the finished ball-cage.

The order of the stages of manufacture described above may, of course, be modified, as will be easily understood by those skilled in the art. The order in which the different devices characterizing this invention are to be manufactured and the stages at which their formation is to be effected will, moreover, depend upon the shape of the rings.

Having now described my invention, what I claim as new and desire to secure by Letters Patent is:—

1. A ball-cage for ball bearings, comprising rings of sheet metal, projections on said rings so folded as to form recesses, and tongues projecting from the rings and engaging said recesses, said tongues being formed with any cross-section other than a flat one.

2. A ball-cage for ball bearings, comprising rings of sheet metal, projections on said rings so folded as to form recesses, and tongues projecting from the rings and engaging said recesses, the outer extremities of the tongues being turned over for locking the rings together.

3. A ball-cage for ball bearings, comprising rings of sheet metal, projections on said rings so folded as to form recesses, and tongues projecting from the rings and engaging said recesses for the assembling of the ball-cage, said tongues being formed with any cross-section other than a flat one and the outer extremities of the tongues being turned over for locking the rings together.

4. A ball-cage for ball bearings, comprising rings of sheet metal, wings formed on the rings and adapted to separate the balls, brackets carrying said wings, the wings and the brackets being so folded as to form recesses, and tongues formed on the rings and engaging the recesses of the adjacent rings, said tongues being formed with any cross-section other than a flat one.

5. A ball-cage for ball bearings, comprising rings of sheet metal, wings formed on the rings and adapted to separate the balls, brackets carrying said wings, the wings and the brackets being so folded as to form recesses, and tongues formed on the rings and engaging the recesses of the adjacent rings, the outer extremities of the tongues being turned over between the rings for locking the rings together.

6. A ball-cage for ball bearings, comprising rings of sheet metal, wings formed on the rings and adapted to separate the balls, brackets carrying said wings, the wings and the brackets being so folded as to form recesses, and tongues formed on the rings and engaging the recesses of the adjacent rings, said tongues being formed with any cross-section other than a flat one and the outer extremities of the rings being turned over between the rings for locking the rings together.

7. A method of producing rings for ball-cages for ball bearings, consisting in producing blanks of sheet metal in the form of plane rings having ball-spacing projections and tongues, bending the ball-spacing projections so as to form recesses, bending the tongues so as to enable them to enter the corresponding recesses of a second ring and forming the tongues with a cross-section other than a flat one, substantially as and for the purpose set forth.

8. A method of producing rings for ball-cages for ball bearings, consisting in producing blanks of sheet metal in the form of plane rings having ball-spacing projections and tongues, bending the ball spacing projections so as to form recesses, bending the tongues so as to enable them to enter the corresponding recesses of a second ring, and forming the tongues with a cross-section other than a flat one and the outer extremity of each tongue with a bill, substantially as and for the purpose set forth.

9. The method of producing ball cages for ball bearings, which consists in producing blanks of sheet metal in the form of plane rings having ball-spacing projections and tongues, bending the ball-spacing projections so as to form recesses, bending the tongues so as to enable them to enter the corresponding recesses of a second ring, forming the tongues with a cross-section other than a flat one, and uniting the rings by pairs by pressing them together so as to cause the tongues of the one ring to enter the recesses of the second ring.

10. The method of producing ball cages for ball bearings, which consists in producing blanks of sheet metal in the form of plane rings having ball-spacing projections and tongues, bending the ball-spacing projections so as to form recesses, bending the tongues so as to enable them to enter the corresponding recesses of a second ring, forming the tongues with a cross-section other than a flat one, and the end of each tongue with a bill, and uniting the rings by pairs by pressing them together so as to cause the tongues of the one ring to enter the recesses of the second ring.

11. A ball cage ring formed of sheet metal and provided with projections so folded as to form recesses and tongues formed with any cross-section other than a flat one, said tongues being adapted for entering and engaging the recesses of a similar ring when assembled therewith.

12. A ball cage ring formed of sheet metal and provided with projections so folded as to form recesses and tongues formed with any cross-section other than a flat one, said tongues being turned over at their outer extremities for facilitating further bending in assembling and locking, said tongues being adapted for entering and engaging the recesses of a similar ring when assembled therewith.

In testimony whereof I have signed my name in presence of two subscribing witnesses.

KALEB KARLSSON.

Witnesses:
KARL RUNCSKOG,
R. SKOGLUND.

Copies of this patent may be obtained for five cents each, by addressing the "Commissioner of Patents, Washington, D. C."